Patented Apr. 24, 1945

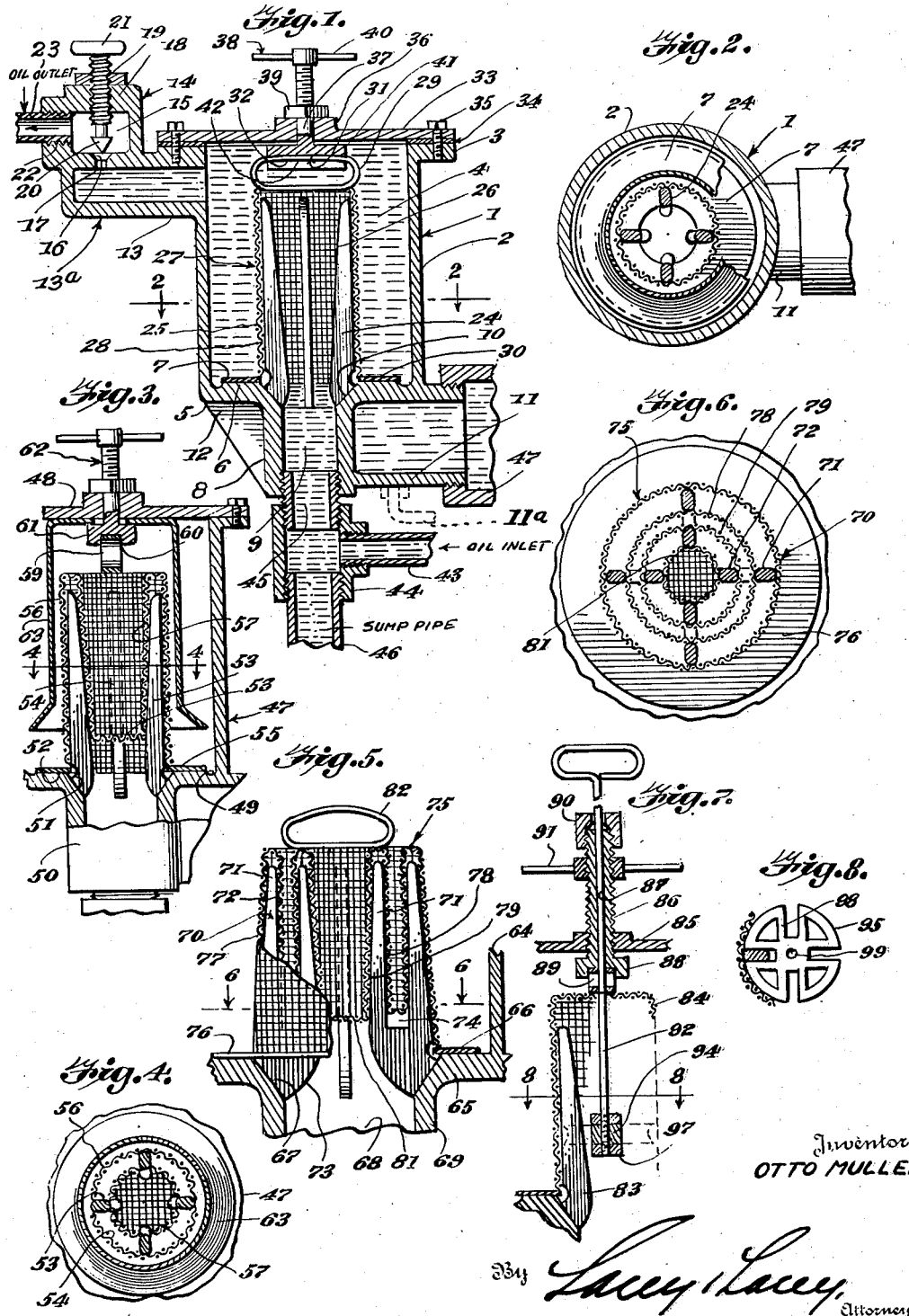

2,374,613

UNITED STATES PATENT OFFICE 2,374,613

STRAINER

Otto Müller, Bronx, N. Y.

Application January 12, 1942, Serial No. 426,519

14 Claims. (Cl. 210—150.5)

This invention relates to devices for cleaning and purifying oil and more particularly to an improved strainer.

One of the principal objects of the invention is to provide a strainer wherein means is embodied for permitting the application of heat directly to the strainer element employed so that said strainer element will be maintained at a temperature above that of surrounding oil, said heated strainer reducing the viscosity of relatively heavy oils, which are of relatively high viscosity when cold, so as to permit them to flow readily through the strainer element rather than to increase in viscosity, as would be the case if relatively heavy oil was forced to flow through a relatively cold strainer.

Another object of the invention is to provide a strainer wherein the strainer element, when heated to a higher temperature than that of the surrounding oil, will prevent jelling of paraffin and other matter in the oil, which paraffin and other matter would tend to jell if the oil was required to flow through a relatively cold strainer.

A further object of the invention is to provide a device of this character wherein means is employed for heating the strainer element to a high temperature while no oil is flowing through it for softening foreign matter which may have jelled and caused other foreign particles to adhere to said strainer element, said foreign matter tending to obstruct future flow through said strainer element, the softening of said jelled matter permitting heavier particles to fall away from the strainer element for permitting unrestricted flow through it, said softening of the jelled matter being accomplished by a heating medium which is maintained at a higher temperature than the temperature of the oil flowing through the said strainer. During the period that the relatively colder oil is flowing through it, the strainer is cooled by said oil but never to a temperature as low as that of the oil flowing through it. When the oil flow ceases, its cooling effect stops and the temperature of the strainer rises to the temperature of the heating medium.

Another object of the invention is to provide a strainer which will cause foreign matter which cannot pass through it to fall away from and out of the strainer element into a sump, thereby preventing the accumulation of foreign matter which would eventually restrict flow through the strainer element.

Another object of the invention is to provide a strainer having means for transferring heat from an outside medium to the strainer element.

Still another object of this invention is to provide, in a device of this character, means for concentrating heat from an outside medium onto the strainer element and the oil immediately surrounding it.

A further object of the invention is to provide, in a strainer, means for supporting the strainer element and retaining it in proper relative position.

A still further object of this invention is to provide, in a modified embodiment, a compactly assembled unitary multi-strainer element which may be fitted into a limited space, all of the dirt accumulating surfaces of said element being so arranged that all foreign matter can fall away from said strainer and not accumulate on the accumulating surfaces thereof.

Still another object of the invention is to provide, in a strainer according to the above mentioned modified embodiment, means for supporting the multi-strainer element and preventing it from moving out of operative position.

A further object of the invention is to provide, in a device of this character, means for regulating the flow of oil of relatively high viscosity, which is required to be heated for proper and useful operation and which must flow at a constant rate under a fixed pressure from the source to where it is to be used.

Another object of this invention is to provide a strainer having means for heating the regulating means and the oil within it thus preventing the increase in viscosity of relatively heavy oil, as would be the case if the heated oil were cooled, as it flowed through said regulating means.

A still further object of the invention is to provide means for heating the regulating means and the oil within it while no oil is flowing through it, thereby preventing the cooling of the oil within the regulating means which would decrease the rate of flow at the start of the next operating cycle until the cold oil is replaced with oil of proper temperature.

Another object of this invention is to provide a device which will during the periods between operating cycles contain a quantity of oil at relatively high temperature which will be available to heat the connecting pipes between the regulating device and the apparatus to which warm oil is to be supplied. The higher temperature to which the oil in the strainer housing will be heated during idle periods will overcome the lower temperatures to which the connecting pipes cool while the equipment is not in operation and during which time no warm oil is flowing through them. This is accomplished by a heating medium which is maintained at a higher temperature than the temperature of the oil flowing through the regulating device. While oil is flowing through the regulating device, the regulator is cooled by the oil to the temperature of the oil but never lower than the temperature of the oil flowing through it due to the influence of the heating medium. The resultant temperature of the regulating device brought about by the temperature of the oil flowing through it and the temperature of the heating medium becomes the normal or operating temperature at which the regulating device is set to the proper rate of flow.

During a relatively long period between operating cycles at which time no oil is flowing through the strainer and regulating device, the idle oil in the strainer housing and regulating device will be heated to a higher than normal or operating temperature by the heating medium. During this same period, the oil in the pipes connected to the device will cool to a lower temperature than the normal or operating temperature and will offer a greater resistance to flow due to the increased viscosity. This increased resistance to flow when the apparatus is again put into operation is compensated by the high temperature and low viscosity of oil in and at the regulating device. The relatively cold oil entering the device at this time is fed into the lower part of the device to which the heating medium is directly connected and from there into the inside of the strainer where it is mixed with the hot oil localized therein by and under a strainer hood. The relatively hot oil from the device readily flows out through the regulating device mixing with the cooler oil in the connecting pipe and heating the pipe to normal operating temperature. Thus this device becomes an automatic regulating device which compensates for temperature decrease during idle periods and assures constant rate of flow at all settings.

Another object of this invention is to provide a means of heating the regulating device to high temperatures while no oil is flowing through it thereby softening any foreign matter which might have jelled and caused other foreign matter to adhere to and obstruct the rather small opening in the regulator. The softening of the jelled matter will permit the foreign matter to fall away or pass through the regulating device and permit unrestricted flow through it.

A further object of the invention is to provide a device of this character which may be easily attached to a furnace or other heating medium.

A still further object of the invention is to provide a strainer wherein, in a modified embodiment, means is employed for cooperating with the element supporting means for cleaning the strainer element without removing it from operative position.

And a still further object of the invention is to provide a strainer, and regulating device for operation therewith, which will be of simple construction and highly efficient in use.

Other objects of the invention will become apparent as the description proceeds.

In the drawing:

Figure 1 is a vertical sectional view of my improved strainer, partly in elevation, the regulating device being shown integral with the strainer and in section, Figure 2 is a horizontal sectional view on the line 2—2 of Figure 1 looking in the direction indicated by the arrows, Figure 3 is a detail vertical sectional view showing a modified embodiment of the invention, Figure 4 is a horizontal sectional view on the line 4—4 of Figure 3, Figure 5 is a detail vertical sectional view, partly in elevation, showing a still further modification, Figure 6 is a horizontal sectional view on the line 6—6 of Figure 5, Figure 7 is a detail vertical sectional view showing still another modification, and Figure 8 is a detail horizontal sectional view on the line 8—8 of Figure 7.

Reference is first had to Figures 1 and 2 of the drawing wherein one embodiment of the invention is illustrated. The strainer of this embodiment includes a body 1 having a preferably cylindrical wall 2 which terminates at its upper end in an outwardly disposed radial flange 3. The cylindrical wall defines a circular chamber 4 which is partially closed at its lower end by a bottom wall 5. The bottom wall is formed with an annular thickened portion 6 having a flat upper surface 7. Formed on the bottom wall 5 exteriorly and axially thereof is a depending nipple 8 having an axial opening 9 therein, said opening communicating with the interior of the chamber 4 and being connected with the flat upper surface 7 by an inverted frusto-conical wall 10. As will be seen, the lower end of the nipple 8 is internally threaded to receive one end of a coupling, to be described in more detail hereinafter.

Formed on the bottom wall 5 and on the nipple 8 at one side thereof is a heat inlet pipe 11, said pipe having its outer end portion externally threaded and extending laterally past the limits of the wall 2. If desired, the pipe 11 may be provided with a coupling, flange or other suitable connecting means in lieu of the threads. Formed on the bottom wall 5 and the nipple 8, at a point diametrically opposite the pipe 11, is a web 12 which serves to reinforce the nipple and to aid in conducting heat to the bottom wall 5.

The body 1 is formed, at the upper end of the wall 2 at one point on its circumference, with an outlet pipe 13, which forms part of a regulating valve 13a, and formed integrally on said outlet pipe is a regulator valve housing 14. The regulator valve housing includes a valve chamber 15 which communicates with a valve seat 16, an opening 17 communicating between the valve seat and the interior of the pipe 13. The housing 14 is formed with a thickened top wall 18 through which is screwed a valve stem 19. The valve stem 19 carries, at its lower end, a frusto-conical valve element 20 which is engageable with the valve seat 16. The valve stem 19 carries, at its upper end, a handle 21 for manual engagement. Communicating with the interior of the chamber 15 is an internally threaded outlet opening 22 which receives the externally threaded end portion of an outlet pipe 23.

Formed on the wall 10 and extending upwardly within the chamber 4 throughout substantially three-fourths of its height are ribs 24. The ribs, as best seen in Figure 2, are preferably four in number, although it should be understood that a greater or less number of them may be employed, as desired. Said ribs have straight outer edges 25 and inner edges 26 which are tapered toward their corresponding upper ends. As will be seen, the ribs define an axial support for the strainer element to be described hereinafter, as well as providing means for conducting heat to said strainer element, as will also be explained more fully further on in the specification.

Removably mounted within the chamber 4 of the body 1 and surrounding the ribs 24 in engagement with the outer edges 25 thereof is a strainer element 27. The strainer element is formed mostly of foraminous material and includes a cylindrical side wall 28, a top wall 29 and a radial bottom flange 30, said bottom flange being of non-foraminous material and normally overlying the flat surface 7 of the thickened portion 6 of the bottom wall 5. Riveted or otherwise secured to the top wall 29, and extending substantially diametrically thereof, is a substantially elliptical handle 31, said handle being formed from a strip of sheet metal. The handle 31 includes a top portion 32 which is engageable for permitting rotation of the strainer element.

Normally closing the chamber 4 of the body 1 at its upper end is a cover 33 which is circular in shape and which has its outer margin overhanging the upper surface of the flange 3. A gasket 34 is disposed between the cover 33 and the flange 3 and said cover is held in place by screws 35. In this connection it should be understood that the cover 33 may be held in place by other types of clamping devices, if so desired. Formed on the cover 33 axially thereof is an upstanding boss 36 which is apertured to receive the stem 37 of the strainer element cleaner 38. The stem 37 is externally threaded throughout its major portion and screwed on said threaded portion is a lock nut 39. The strainer element cleaner 38 includes a handle 40 which is adapted for manual engagement. At its lower end the stem 37 carries an integral handle engaging element 41, said handle engaging element being formed with a longitudinally extending slot 42 which receives the portion 32 of the handle 31. It will now be understood that, when the stem 37 is rotated, by manual gripping the handle 40, said rotative movement will be communicated to the strainer element and said strainer element will be rotated about the ribs 24 for dislodging foreign matter which may have collected on the inner surface of said strainer. The lock nut 39 may be tightened for locking the stem 37 in fixed position and, when said stem is locked, the strainer element will, of course, also be locked against rotation. In order to lead oil to the interior of the strainer, I employ an oil inlet pipe 43. The oil inlet pipe is connected to the nipple 8 by a T connector 44 and a coupling 45. A sump pipe 46 is also connected to the T connector and receives dirt and other foreign matter from the interior of the strainer element 27.

My improved strainer, according to the hereinbefore described embodiment, is installed by screwing the externally threaded end portion of the pipe 11 into the internally threaded boss 47 on a furnace or other heating medium. In this connection it is desired to state that the means of fastening may consist of a flanged arrangement with bolts or any other suitable means. It is also desired to state that the heat inlet pipe need not be connected with a source of liquid, as the heat from the furnace or other heating medium will be transmitted through the body 1 to the oil. It is also desired to point out that if so desired, the pipe 11 may surround the lower end of the body and the nipple to define a liquid jacket. A small return pipe, shown at 11a, may be employed for returning the oil to the furnace or other source. The lower inlet pipe 43 is then connected with a source of oil to be filtered and the sump pipe is connected with a suitable sump tank, drain or other device for accumulating, for periodical removal, dirt and other foreign matter.

In use, heat will, as stated, be transmitted directly from the boss 47 through the heat inlet pipe to the body. Heat will, of course, also be communicated to the ribs 24 and thus to the strainer 27. When oil is caused to flow through the oil inlet pipe 43, the connector 44 and the coupling 45 into the nipple 8 and into the strainer element 27, said oil will be filtered or strained by said element 27. The strained oil will, of course, pass into the chamber 4 and outward through the regulator valve 13a which, as has been stated hereinbefore, is also heated.

It is desired particularly to call attention to the fact that the strainer element will be maintained at a temperature higher than that of the oil flowing into its interior. Therefore, paraffin or other matter which would tend to jell due to low temperature or otherwise and cause foreign matter to adhere to the inner side of the strainer element will be prevented from doing so by the higher temperature of the strainer. Thus foreign matter on the inside of the strainer will be permitted to freely fall away and subsequently drop to the sump or drain through the pipe 46.

It is desired to call attention to the fact that during the period when no oil is flowing through the strainer the strainer and the surrounding oil will reach a still higher temperature and continue to do so until the maximum temperature of the heating medium has been reached. This would tend to soften any material that may have jelled and adhered to the strainer at the lower temperature which exists while oil is flowing through the strainer.

It is also desired to call attention to the fact that the heat transmitted by the ribs 24 to the strainer element 27 will in turn heat any matter adhering thereto and the oil immediately surrounding same. This heat is localized to the oil within the strainer and immediately surrounding same by the hood which surrounds the strainer. This localizing of heat greatly increases the effectiveness of the heat supplied from the heating medium.

It has been found in actual practice that the strainer element 27 will remain clean for long periods of time but, should it be desired to remove foreign matter from the interior of the strainer element, this may be done without removing the strainer element from the strainer, in the manner to be now described.

In order to clean the strainer element, the stem 37 is rotated and said rotative movement is transmitted to the strainer element 27 through the handle 31. As the strainer element is rotated, the edges 25 of the ribs 24 will scrape jelled paraffin and/or other foreign matter from the interior of the surface of said element and this scraped matter will fall into the sump tank through the pipe 46.

In Figures 7 and 8, there is shown another method for cleaning the strainer element, and this will be described hereinafter.

The ribs 24, in addition to their function hereinbefore set forth, also serve to prevent collapse of the strainer element. The handle 31 on the strainer element, in addition to its other function just described, provides convenient means for permitting manual engagement when it is desired to remove said strainer element.

When the strainer unit is equipped with the regulating valve 13a, as shown in Figure 1, it can be clearly seen that the rate of flow through the strainer can be definitely controlled. I wish to at this time call attention to the fact that this regulating valve is particularly meritorious when used in conjunction with equipment operating on relatively heavy oil of high viscosity which requires heating for useful and proper operation and which is required to flow at a constant rate under a fixed pressure from a source to where it is to be used. Such oils change in viscosity when the temperature changes. Under changing temperature and viscosity flow through a fixed orifice under fixed pressure will not be constant. Apparatus requiring such heated oil usually operate for varying periods of time. Warm oil is supplied during operating periods from a source and fed through strainers, regulating devices and pipes connecting thereto to the source where it is to be used. After a short period of operation during which time warm oil is flowing through the above mentioned equipment the temperature of the equipment reaches what hereinafter will be termed the normal or operating temperature. It is at this normal or operating temperature that the regulating device is set to the required rate of flow and as long as the temperature remains constant so will the viscosity and the rate of flow. Should the temperature of the oil be lowered its viscosity would increase and the rate of flow would decrease. During periods when the equipment is not in operation and at which time no oil is flowing through the equipment the regulating device and the oil therein would cool to below normal or operating temperature. This lower temperature would decrease the viscosity of the oil in the strainer, regulating device and connecting pipes. At the beginning of the next operating cycle the more viscous oil would offer a greater resistance of flow through the regulating device and the connecting pipes and thereby reduce the rate of flow to the equipment being supplied. This condition would continue until the cold oil has been consumed and the incoming heated oil again raises the temperature of the equipment to the normal or operating temperature. However, in my device the strainer, regulating valve 13ª and oil therein does not cool due to the heat transmitted from the heating medium. In fact, the temperature of the strainer, regulating valve and oil therein is increased to that of the heating medium which is always at a higher temperature than the normal or operating temperature. Thus when the equipment begins to operate, the cooled oil from the supply line to the strainer enters the nipple 8 which is the warmest part of the strainer and flows into the inner chamber of the strainer where the hottest oil is localized. Thus the lower temperature of the incoming oil is compensated for by the higher temperature of the oil within the strainer unit. At the same time the oil in the chamber 4 and the regulating valve which has been heated to above normal flows through the regulating valve, mixes with the cool oil in the connecting pipes and raises the temperature of the oil and pipe to the normal or operating temperature. At the time the equipment starts, the tendency of the oil in the strainer and regulating valve which has been heated to above normal or operating temperature and, therefore, having a lower viscosity, would be to increase the rate of flow through the fixed orifice in the regulating valve which has been set for oil of higher viscosity. However, this freedom of flow at this point is compensated by the increased resistance to flow of the colder and heavier oil in the connecting pipes.

Thus this device becomes an automatic regulating device which compensates for temperature decrease during idle periods and assures constant rate of flow at all settings.

In Figures 3 and 4 of the drawing, I have shown a modified embodiment of the invention. The numeral 47' indicates the body of this modification and said body is formed with a removable top wall 48 and a bottom wall 49. Formed on the bottom wall is a nipple 50 and communicating between the nipple 50 and the bottom wall 49 is an inclined bottom wall 51. The bottom wall 49 has a thickened portion which is formed with a flat upper surface 52. Rising from the wall 51 are ribs 53 which are similar to the ribs 24 and which extend to substantially three-fourths the height of the body 47. Normally carried on the ribs 53 within the chamber defined by the body is a strainer element 54. The strainer element is formed mostly of foraminous material but includes a non-foraminous bottom flange 55 which overlies the flat upper surface 52 of the wall 49. The strainer element 54 includes an outer straining surface 56 which is extended and turned downwardly concentrically to define an inner straining surface 57, said inner straining surface having a foraminous lower straining wall 58. It will be seen that the surfaces 56 and 57 straddle the ribs 53 and are held in proper shape and operative position by said ribs. Carried on the strainer element at its upper end is a handle 59 which is similar to the handle 31. The handle 59 has its upper portion engageable in a slot 60 which is formed in a handle engaging element 61. The handle engaging element 61 forms a part of a strainer element cleaner assembly 62 which is similar to the strainer element cleaner 38.

Clamped between the handle engaging element 61 of the strainer element cleaner 62 and the inner surface of the wall 48 is a substantially bell shaped hood 63 which extends downwardly within the chamber defined by the body 47 and in surrounding relation to the strainer element 54, in spaced relation to said strainer element.

The operation of this embodiment of the invention is similar to that of the form shown in Figures 1 and 2. However, the construction of the strainer element 54 in this embodiment of the invention is such that a greater straining surface will be presented to the heated oil, due to the fact that the strainer element includes the outer and inner straining surfaces 56 and 57. Also, oil passing from the strainer element, after having been strained, is deflected by the hood, said hood concentrating the heat about the strainer element for retaining the same at the high temperature. Also, the hood will function to prevent an appreciable outward flow of oil and will deflect said oil flow downwardly. Thus, incoming oil of low temperature is compensated for by higher temperature oil within and about the strainer element.

During periods when the oil is not flowing through the strainer the effectiveness of the external heating medium is concentrated to the strainer element and the limited quality of oil underneath the hood. Thus the foreign matters that may have jelled and adhered to the strainer during running periods will be heated to a high temperature, be softened and will permit any foreign particles to fall away from the strainer into the sump.

The strainer element may be cleaned by rotating the strainer element cleaner which, as has been described, causes rotative movement to be transmitted to the strainer element through the handle 59. As the strainer element is rotated, the impurities will be cleaned from the surfaces 56 and 57 thereof by the edges of the ribs 53.

In Figures 5 and 6 of the drawing, I have shown a modified strainer element construction and ribs of modified construction for supporting the strainer element. A portion of a body similar to the body 1 is shown at 64. The body 64 includes a bottom wall 65 having a thickened upper surface 66. An inclined wall 67 communicates between the surface 66 and the opening 68 of a nipple 69. Formed on the wall 67 and rising therefrom are ribs 70. The ribs 70 are four in number but, as should be understood, any suitable number may be employed. The ribs are identical in construction so that a description of one will suffice for both. Each of said ribs is bifurcated throughout the major portion of its height to define arms 71 and 72, said arms being connected at their lower ends by a base portion 73 and said arms defining a pocket 74.

Removably mounted on the ribs 70 is a strainer element which is shown generally at 75. The strainer element 75 is, like the strainer elements 27 and 54, formed axially of foraminous material. However, said strainer element 75 includes a bottom flange 76 which is formed of non-foraminous material and which overlies the upper surface 66 of the wall 65. The strainer element is of truncated shape and includes an outer straining surface 77 and a re-entrant portion defining a plurality of spaced inner straining surfaces 78, 79 and 80 which inner straining surfaces are disposed concentrically with respect to each other and to the nipple 69. More specifically, the outer straining surface 77 is connected at its upper end to the upper end of the inner straining surface 78. The lower end of the inner straining surface 78 is connected to the lower end of the inner straining surface 79 and the upper end of the inner straining surface 79 is connected with the upper end of the straining surface 80. The straining surface 80 is substantially frusto-conical and is closed at its lower end by a wall 81, of foraminous material. A handle 82 is connected with the strainer element 75 and extends diametrically thereof, the connection being made to points on the rim which define the juncture between the surfaces 79 and 80.

The strainer element of this embodiment of the invention will operate in a similar manner to that of the strainer elements 27 and 54. However, inasmuch as a greater number of straining surfaces have been provided, greater straining efficiency may be expected. Rotation of the strainer element 75, by rotating the handle 82, will effect cleaning of the straining surfaces, by action of the arms 71 of the ribs, the edges of which arms will engage said surfaces. The arms will, of course, serve to retain the strainer element of this embodiment of the invention in proper operative position and against collapse. The arms of the ribs, as will be seen, assure proper spacing for the straining surfaces and assure that said straining surfaces are so mounted that foreign matter may drop therefrom, during cleaning and at other times, into the opening 68. As will be understood from the foregoing, the strainer element of this embodiment of the invention will be operative for causing effective straining of oil passing therethrough at a relatively high volume and speed.

In Figures 7 and 8 of the drawing, I have shown a modified construction which consists of improved mechanism for cleaning the interior of the strainer element. In these views, the numeral 83 indicates a rib similar to the rib 24. At 84 is shown a strainer element somewhat similar to the strainer element 27. A portion of the top wall of a body similar to the body 1 is shown at 85, and rotatably mounted in said top wall is a strainer element cleaning stem 86 which is formed with an axial bore 87 throughout its length. At its lower end the stem 86 is formed with a handle engaging portion 88 which is engageable about a handle 89 on the strainer element 84. At its upper end the stem is split and carries a clamping nut 90. The stem is threaded and also carries a handle 91 for manual engagement.

Slidably mounted in the bore 87 of the stem 86 is a plunger rod 92. As best seen in Figure 7, the plunger rod is bent at its upper end portion to define a substantially elliptical handle portion 93. At its lower end the plunger is formed with a threaded portion 94. Mounted on the threaded portion is a spider 95. The spider 95 is held in place on the threaded portion 94 by nuts 96 and 97 and, as best seen in Figure 8, the spider is substantially circular in shape, having rectangular notches 98 which communicate with a hub portion 99.

As best seen in Figure 7, the plunger 92 extends axially through the top wall of the element 84 and the spider is normally carried within said element with the ribs 83 thereof disposed in the notches 98. When the plunger 92 is raised and lowered in the stem 86 and in the element 85, the spider will be raised and lowered in the element for cleaning the inner surface thereof. In addition, the stem 86 may be rotated for rotating the element about the rib 83, this action also having the effect of cleaning the interior surface of the said element 84.

It is believed from the above description that it will be seen that I have provided a strainer and regulating valve of simple construction and one wherein the strainer element is maintained at a temperature which will assure maximum straining efficiency and constant rate of flow. Also one which will remain clean for a maximum period of time without attention and which can be mechanically cleaned without disassembling the device and without removing the strainer element.

Having thus described the invention, what is claimed as new is:

1. A strainer including a hollow body, a liquid inlet pipe connected to the body, a heat inlet pipe connected with the body, a strainer element in the body, means in the body and within the strainer element for conducting heat to the strainer element, said heat inlet pipe conducting heat to the body and to said first-mentioned means, means for leading liquid strained by said strainer element from the body and means carried by the body and engageable with the strainer element for rotating said strainer element within the body and against said first-mentioned means for cleaning foreign matter from the interior of the strainer, said strainer element being maintained by said first-mentioned means at a higher temperature than liquid to be strained flowing into the body.

2. A strainer including a chamber, means for conducting heat to the chamber at the bottom thereof, a hollow strainer element in the chamber, ribs in the chamber for conducting heat to the strainer element from the bottom of the chamber, means for conducting liquid to the interior of the strainer element within the chamber for straining of the liquid by said strainer element as the liquid flows through the strainer and into the chamber, means for conducting liquid from the chamber, and means for conducting heat to said first mentioned means for maintaining the strainer element at a temperature higher than that of the liquid whereby softening of impurities in the liquid and depositing of said softened impurities on the interior of the strainer element will take place.

3. A strainer including a chamber, a strainer element in the chamber, means for conducting heat to the bottom of the chamber, means in the chamber and in engagement with the strainer for bracing the strainer and conducting heat from the bottom of the chamber to the strainer element, means for conducting liquid to the chamber at a point within the strainer element, said second-mentioned means cooperating with the first mentioned means for maintaining the strainer element at a higher temperature than the liquid flowing into it with the result that impurities in the liquid will be softened and will adhere to the interior of the strainer element, means for leading strained liquid from the chamber, and means for rotating the strainer element within the chamber and about said second-mentioned means, said second-mentioned means scraping the impurities from the interior of the strainer element.

4. A strainer including a hollow body having a bottom wall, means for conducting heat to the bottom wall of the body, said bottom wall having a nipple formed with an opening at its top through said bottom wall, ribs carried on the bottom wall about the opening, a strainer element carried in the body about said ribs and in engagement therewith, means for conducting liquid through said nipple to the interior of the strainer element, said first-mentioned means and ribs conducting heat to the strainer element for maintaining the strainer element at a higher temperature than liquid flowing therein for softening impurities in the liquid, said softened impurities adhering to the inner surface of the strainer element, and means for leading strained liquid from the chamber.

5. A strainer including a hollow body having a bottom wall formed with an opening, ribs carried on the bottom wall and rising therefrom about the opening, a strainer element carried in the body and surrounding the ribs in engagement therewith, a cover for the body, and means carried by the cover and engageable with the strainer element for rotating said strainer element about the ribs to effect cleaning of the strainer element by scraping action of the ribs.

6. A strainer including a hollow body having a bottom wall provided with a thickened portion, said thickened portion having a flat upper surface, a nipple formed on the body axially thereof and extending downwardly therefrom, said nipple having an opening at its upper end through the thickened portion of the bottom wall, an inclined wall extending between the flat upper surface of the thickened portion of the bottom wall and the opening at the upper end of the nipple, ribs carried by the body and rising from the inclined surface within the body, a strainer element within the body fitting snugly about the ribs in engagement therewith and having a flange overlying the flat upper surface of the thickened portion of the bottom wall, a handle carried by the upper end of said strainer element, a cover closing the body at its upper end, a stem extending vertically through the cover and having a slot at its lower end receiving a portion of the handle, said stem being rotatable for rotating the strainer element about said ribs and causing cleaning of said strainer element by scraping action of said ribs, and means connected with the nipple for leading liquid to the interior of the strainer element.

7. A strainer including a hollow body having a bottom wall formed with a depending nipple, said nipple having an opening at its top through the bottom wall, a heat inlet pipe connected with the bottom wall and the nipple and engageable with a portion of a furnace for conducting heat from the furnace to the body, a plurality of ribs carried on the bottom wall and rising therefrom within the body about the opening, a strainer element disposed vertically within the body and surrounding the ribs in engagement therewith, means for leading liquid to the nipple, a cover closing the body at its upper end, said strainer element having a handle at its upper end, and a stem rotatably mounted through the cover and having means at its inner end for receiving a portion of the handle and rotating the strainer element about the ribs for effecting cleaning of said strainer element by scraping action of the ribs when the stem is turned, said ribs conducting heat from the bottom wall to the strainer element for maintaining said element at a temperature higher than that of liquid passing into it for softening impurities adhering to the inner surface of said strainer element.

8. A strainer including a hollow body having a bottom wall, a rib on the bottom wall, a strainer element mounted in the body and surrounding the rib, said strainer element having its inner surface engageable with the rib, means engageable with the upper end of the strainer element for rotating said strainer element about the rib, said rib cleaning the inner surface of the strainer element during rotation of the strainer element, a vertically reciprocable member in the strainer in engagement therewith and straddling the rib element for aiding in cleaning the inner surface thereof, and a plunger for carrying and reciprocating said member slidably passing through the means for rotating the strainer element.

9. A strainer including a hollow body having a bottom wall, an upstanding rib on the bottom wall, a strainer element mounted in the body and surrounding the rib in engagement therewith, means engageable with the strainer element for rotating said strainer element about the rib, said rib cleaning the inner surface of the strainer element during operation, and vertically reciprocable means in the strainer element for aiding in cleaning the inner surface thereof, said last-mentioned means including a spider in the strainer element and a plunger for the spider, said plunger having its upper end formed into a handle for manual engagement to permit easy reciprocation.

10. In a strainer, a hollow body having a bottom wall formed with a plurality of ribs, a strainer element mounted in the body in engagement with the ribs, said body having a top wall, a handle on the strainer element, a stem reciprocable in the top wall and having a handle engaging portion engageable with the handle, and means for rotating the stem and handle engaging portion for rotating the handle and strainer element, said strainer element rotating about said ribs and said ribs cleaning impurities from the inner surface of said strainer element during rotation.

11. A strainer including a hollow body having a bottom wall formed with a liquid inlet and carrying upstanding ribs surrounding the inlet, said body having a removable top wall, a strainer element in the body and surrounding the ribs and supported thereby, and a hood carried by the top wall and surrounding the strainer element in spaced relation thereto.

12. A strainer including a hollow body having a bottom wall formed with a liquid inlet and carrying a plurality of ribs upstanding therefrom about the inlet, a top wall closing the body, a strainer element surrounding the ribs within the body and having a handle at its top, a strainer element cleaner rotatably carried by the top wall and engageable with the handle for rotating the strainer element about the ribs, said ribs cleaning impurities from the inner surface of the strainer element by scraping action during rotation thereof, and a hood carried by the top wall of the body and surrounding the strainer element.

13. In a strainer having a hollow body formed with a bottom wall, a plurality of ribs upstanding from the bottom wall, each of said ribs having a bifurcated portion defining spaced arms and a base portion, a strainer element fitted about the ribs and having a plurality of straining surfaces, certain of said straining surfaces engaging the outer edges of said ribs and certain other of said straining surfaces engaging edges of the arms of said ribs, and means for rotating the strainer element, said straining surfaces being cleaned by rotation of the straining element about the arms of said ribs.

14. The combination with a strainer having a hollow body, said body having a bottom wall formed with pairs of spaced upstanding ribs, of a strainer element having an outer straining surface, a re-entrant portion defining a pair of intermediate straining surfaces, and an inner portion defining an inner straining surface, said intermediate straining surfaces being received between the ribs of the pairs of ribs.

OTTO MULLER.